Nov. 27, 1956  H. O. BOWSER  2,772,062
ELECTRIC OUTLET BOX SCREW PLATE
Filed Dec. 16, 1952
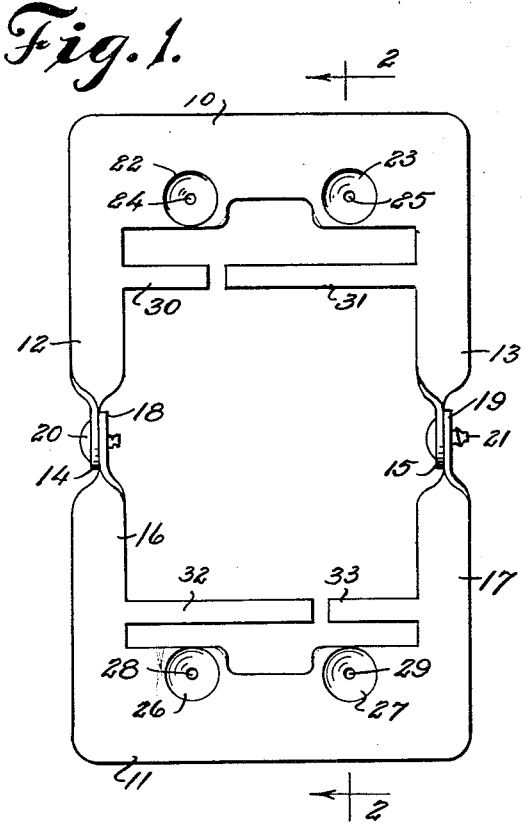
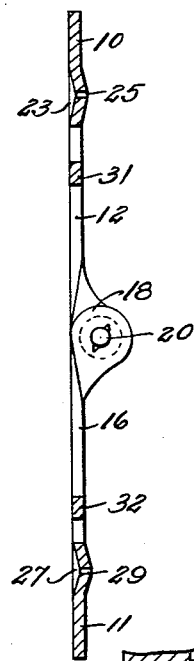
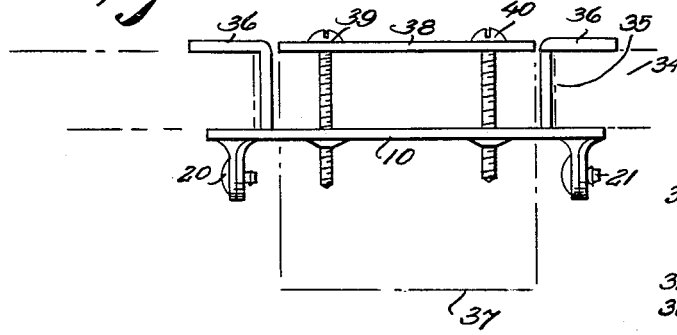
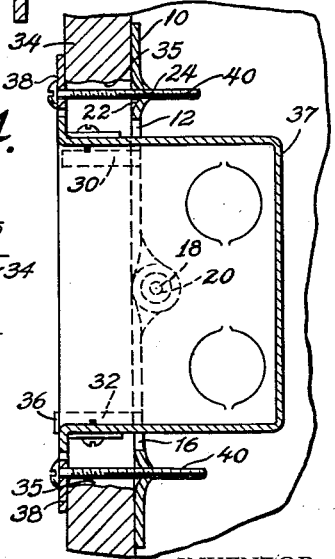
INVENTOR.
*Harley O. Bowser*
BY *Victor J. Evans & Co.*
ATTORNEYS United States Patent Office 2,772,062
Patented Nov. 27, 1956

2,772,062

ELECTRIC OUTLET BOX SCREW PLATE

Harley O. Bowser, Rivera, Calif.

Application December 16, 1952, Serial No. 326,205

1 Claim. (Cl. 248—27)

This invention relates to backing plates used particularly against the inner surfaces of plaster walls for clamping objects in position upon the walls, and in particular in screw or backing plates having threaded openings corresponding with screw holes in an electric outlet box whereby with the plate positioned against the inner surface of a plaster wall screws from an outlet box in the outer surface of the wall are threaded through the openings of the backing plate whereby the outlet box is clamped in position against the outer surface of the wall.

The purpose of this invention is to provide means for positively securing electric outlet boxes to lath and plaster walls with the boxes positioned in openings in the walls.

In numerous instances it is difficult to locate studding in a lath and plaster wall and at times it is difficult to position an electric outlet box on a stud of a wall. With this thought in mind this invention contemplates a plate formed in two sections with the sections pivotally connected at the center to facilitate inserting the plate through an opening in a plaster wall, with fingers on the sections for retaining the plate in position over the edge of a plaster wall and with screw openings positioned to correspond with screws of an outlet box whereby with the device inserted through an opening in a wall the fingers hold it in position as screws inserted through openings in the outlet box are threaded into the screw openings of the device.

The object of this invention, is therefore, to provide a mounting or backing plate that remains permanently in position and that is clamped by screws extended through an outlet box to the inner surface of a wall against the outer surface of which the outlet box is positioned.

Another object of the invention is to provide a mounting plate for retaining an outlet box in position on a lath and plaster wall that is adapted to be folded for insertion into the opening in the wall.

Another important object of the invention is to provide a mounting or backing plate for securing an electric outlet box in an opening of a lath and plaster wall in which means is provided for retaining the plate in position as screws are inserted through the box into the plate.

A further object of the invention is to provide a backing plate for mounting electric outlet boxes in openings of lath and plaster walls which is of a simple and economical construction.

With these and other objects and advantages in view the invention embodies a pair of connections having twisted ends with pins extended through the twisted ends for pivotally connecting sections and with each section provided with fingers adapted to be bent over the edges of lath and plaster, and threaded sockets for screws extended through an outlet box.

Other features and advantages of the invention will appear from the following description taken in connection with the drawing, wherein:

Figure 1 is a plan view of the improved backing plate showing the plate with the parts extended.

Figure 2 is a vertical section through the plate taken on line 2—2 of Figure 1.

Figure 3 is a plan view illustrating the backing plate positioned on the inner surface of a lath and plaster wall with the fingers extended around the edge of the wall and with a plate of an outlet box secured by screws to the backing plate.

Figure 4 is a fragmentary sectional view of the present invention.

Referring now to the drawing wherein like reference characters denote corresponding parts the electric outlet box backing plate of this invention includes U-shaped plates having connecting sections or webs 10 and 11 with the section 10 having arms 12 and 13 with twisted ends 14 and 15 respectively and the section 11 having arms 16 and 17 with twisted ends 18 and 19 respectively, and the sections are pivotally connected with pins 20 and 21, the pin 20 extended through the ends 14 and 18 and the pin 21 through the ends 15 and 19.

The connecting section 10 is provided with conical shaped indentations 22 and 23 and the indentations are provided with threaded openings 24 and 25, respectively that are positioned to receive screws from an outlet box. The connecting section 11 of the other U-shaped member is provided with conical shaped indentations 26 and 27 and the indentations 26 and 27 are provided with threaded openings 28 and 29, respectively.

The arms 12 and 13 are provided with fingers 30 and 31 and corresponding fingers 32 and 33 are provided on the arms 16 and 17 whereby with the mounting plate positioned against the inner surface of a wall, as indicated by the numeral 34 the fingers extend through an opening 35 and the extended ends 36 of fingers 31 and 32 are bent over the outer surface of the wall.

The outlet box, as indicated by the numeral 37 is positioned in the opening 35 and a plate 38 on the face thereof is secured to the backing plate section with screws 39 and 40.

With the parts arranged in this manner a face plate positioned on the outer surface of the outlet box covers the ends 36 of the fingers 31 and 32 and this plate is secured to the outlet box with screws or other fastening means.

The pivotal connections of the pins 20 and 21 make it possible to fold the end sections of the mounting plate together to facilitate storing and shipping and also to facilitate inserting the backing plate through the opening in the wall.

It will be understood that modifications, within the scope of the appended claim, may be made in the design and arrangement of the parts without departing from the spirit of the invention.

What is claimed is:

In an electric outlet backing assembly, a first and second U-shaped plate arranged in the same plane and each of said plates including a connecting web, first and second spaced parallel arms extending transversely from one of said webs, third and fourth spaced parallel arms extending transversely from the other of said webs, the free ends of all of said arms being twisted and lying in a plane at right angles to the major portion of said arms, said twisted portions being arranged in aligned relation with respect to each other, said portions being offset from the remaining portion of the arms whereby the arms may bear flat against the supporting structure, pivot pins pivotally connecting together the twisted portions of said arms, each of said webs being provided with a plurality of spaced apart indentations, said indentations having a curved shape, there being a threaded opening in the center of each of said indentations, a first finger extending inwardly from the first arm of said first plate, a second finger extending inwardly from the second arm of said first plate and said second finger being of greater length than said first finger, a third finger extending inwardly from the first arm of said second plate and said third finger being of the same length as said second finger, and a fourth finger extending from the second arm of said second plate, said fourth and first fingers being of the same length, and said fingers being of bendable material.

References Cited in the file of this patent

UNITED STATES PATENTS

| | | |
|---|---|---|
| 1,490,252 | Bissell | Apr. 15, 1924 |
| 1,549,660 | Ericson | Aug. 11, 1925 |
| 1,791,311 | Hamblen | Feb. 3, 1931 |
| 1,933,053 | Glattly | Oct. 31, 1933 |
| 2,518,912 | Lampe | Aug. 15, 1950 |
| 2,588,596 | Weber | Mar. 11, 1952 |